US007849580B2

(12) United States Patent
Barry et al.

(10) Patent No.: US 7,849,580 B2

(45) Date of Patent: Dec. 14, 2010

(54) ARTICLES AND METHODS FOR INSTALLING HOOK BOLTS

(75) Inventors: David M. Barry, Greenwood, MN (US); David Oram, Jacksonville, FL (US)

(73) Assignee: Lewis Bolt & Nut Company, Wayzata, MN (US)

( * ) Notice: Subject to any disclaimer, the term of this patent is extended or adjusted under 35 U.S.C. 154(b) by 1005 days.

(21) Appl. No.: 11/622,324

(22) Filed: Jan. 11, 2007

(65) Prior Publication Data

US 2008/0169656 A1 Jul. 17, 2008

(51) Int. Cl.
*B23P 11/00* (2006.01)

(52) U.S. Cl. .................. 29/525.02; 29/897; 29/897.31; 29/433; 52/745.13; 52/747.13; 292/95

(58) Field of Classification Search ............. 29/525.01, 29/525.07, 525, 525.02, 525.11, 525.13, 29/433, 897, 897.1; 52/745.13, 747.13; 292/95, 292/96, 101, 256.69, DIG. 49
See application file for complete search history.

(56) References Cited

U.S. PATENT DOCUMENTS

| | | | | |
|---|---|---|---|---|
| 3,727,341 A * | 4/1973 | Nye | .......................... | 43/43.13 |
| 4,143,772 A * | 3/1979 | Bona | ......................... | 211/59.1 |
| 7,373,709 B2 * | 5/2008 | Fernando et al. | ......... | 29/525.01 |

OTHER PUBLICATIONS

Minnesota Department of Transportation: Bridge Construction Manual (500: Timber Construction); http://www.dot.state.mn.us/bridge/manuals/construction/index.html; Nov. 1, 2005.*

* cited by examiner

*Primary Examiner*—David P Bryant
*Assistant Examiner*—Bayan Salone
(74) *Attorney, Agent, or Firm*—Fish & Richardson P.C.

(57) ABSTRACT

Articles and methods for installing hook bolts on bridge decks constructed of timbers and structural steel members. A tether is lowered through a hole in a timber, captured below the bridge deck, and drawn upward around the timber or between timbers. A hook bolt is engaged with the end of the tether that was lowered through the hole and drawn upward, then lowered under the bridge deck and drawn upward through the hole in the timber. The hook bolt engages with a flange on a structural member of the bridge deck.

14 Claims, 11 Drawing Sheets

ARTICLES AND METHODS FOR INSTALLING HOOK BOLTS

BACKGROUND

1. Technical Field

The invention relates to articles and methods for installing hook bolts, and more particularly to the installation of hook bolts to fasten timbers to structural members, including on railroad bridge decks that are constructed with timbers affixed to steel structural members.

2. Background Information

Hook bolts are used to affix bridge timbers to steel structural members with a hook extending from the body of the bolt that engages the top flange of a steel beam. The current method for installing hook bolts on bridge decks requires the installer to gain access to the underside of a bridge, for example by using scaffolding, by hanging below the bridge in a basket, or by laying on the bridge deck (on creosote ties) to reach down and install the hook bolt in the bridge timber. These methods are dangerous, as well as inefficient, time consuming, and expensive.

SUMMARY

The invention relates to improved articles and methods for installing hook bolts on bridge decks. The invention obviates the need for an installer of a hook bolt to gain access to the underside of a bridge by using a basket or scaffolding in order to install a hook bolt, or the need to lay on the bridge deck in order to install a hook bolt.

In one aspect, the invention relates to a method of installing a hook bolt on a bridge deck wherein the bridge deck is comprised of bridge timbers affixed to steel members. The method includes the steps of:

providing a tether adapted to engage with a hook bolt, wherein the tether has first and second ends;

passing the second end of the tether through a hole in a bridge timber such that the second end of the tether is below the bridge timber;

capturing the tether from below the bridge timber;

drawing upward a portion of the tether that was passed through the hole under the bridge deck;

engaging a hook bolt with the second end of said tether;

lowering the hook bolt around or between bridge timbers to a position below the bridge timber; and drawing the hook bolt upward into the hole.

The tether may comprise a cable having first and second ends, and a rod attached at one end to the second end of the cable. The rod may include threads at a second end, and an index for aligning the direction of the hook on the bolt when a hook bolt is attached to the rod. The index may be in the form of a notched ring. The hook bolt may include matching threads to the threads on the rod, and may also include fins adapted to engage with the bridge timber when driven into the timber. The rod may further include a slot proximal to the end attached to the cable.

The step of engaging said hook bolt with the tether may include engaging the threads on the rod with the matching threads on the hook bolt, and may further include the step of aligning the index with the direction of the hook on the hook bolt.

The method may further comprise the step of driving the hook bolt into the timber. In preferred embodiments, prior to driving the hook bolt into the bridge timber, the hook of the hook bolt is aligned, using the index, such that the hook is positioned to engage with the flange of a structural member.

The installer may then start drawing the rod and hook bolt upward into the hole, and may pull the cable to engage the fins of the hook bolt with the timber.

The step of driving the hook bolt into the timber may further comprise the steps of providing a slide hammer, engaging the slide hammer with the slot of the rod, and operating the slide hammer to drive the hook bolt into the timber. Preferably, the slide hammer includes a hook, for example, a J hook, to engage with the slot on the rod. The hook bolt is preferably driven into the timber such that a portion of the threaded first end of the hook bolt passes upward through the hole to the upper side of the bridge deck. Once the rod is then disengaged from the hook bolt, at least a portion of the threads are above the bridge deck, and the fastening of the hook bolt can be completed.

The step of drawing said tether upward between bridge timbers preferably includes capturing the portion of the tether below said bridge deck with a hook.

The method may further comprise the step of engaging the hook bolt with a flange of a steel member.

In another aspect, the invention features a kit for installing a hook bolt on a bridge deck, wherein the bridge deck is comprised of multiple timbers affixed to steel members.

The kit comprises a tether adapted to engage with a hook bolt, the tether having first and second ends. The tether preferably includes a cable having first and second ends, and a rod attachable at one end to the second end of the cable, with the rod adapted at a second end for engagement with a hook bolt. The rod may include threads at a second end opposite the end attached to the cable.

The kit may further include a hook bolt comprising matching threads to the threads on the rod. The rod may include an index, and the index may preferably be in the form of a notched ring.

DETAILED DESCRIPTION

Figure 1:
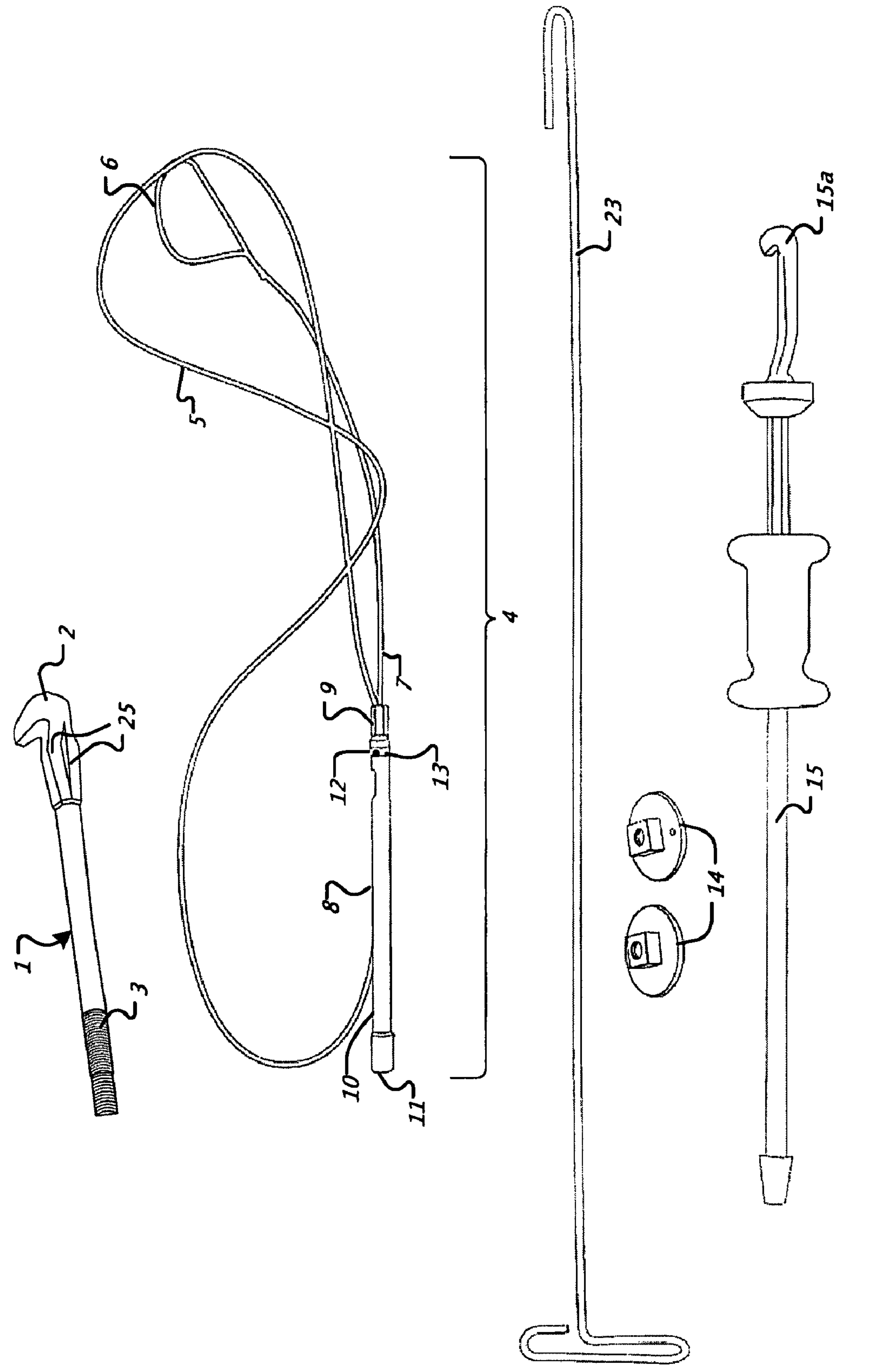
FIG. 1 depicts various articles suited for us in the installation of hook bolts in accordance with the invention.

FIG. 1 depicts the materials useful for installing a hook bolt in accordance with the invention. A hook bolt 1 is provided with a hook 2 extending from the body of the bolt, and threads 3. As shown in FIG. 1, the hook bolt 1 further comprises at least one fin (shown as plurality of fins 25). The hook bolt 1 can vary in length depending on the thicknesses of the bridge timbers and the structural members. A tether 4 is provided, and depicted in FIG. 1 in a preferred embodiment in which the tether 4 includes a cable 5 having first and second ends 6 and 7 respectively, and a rod 8 attached at one end to the second end 7 of the cable 5. The rod 8, as shown in FIG. 1, includes first and second ends 9 and 10 respectively, internal threads 11 at the second end 10 that, in preferred embodiments, match the threads 3 of the hook bolt, and an index 12, which in FIG. 1 is shown in its preferred embodiment as a notched ring 13. As shown in FIG. 1, the first end 9 of the rod 8 is attached to the second end 7 of the cable. FIG. 1 further shows a capturing hook 13, nut/washer combination 14, and a slide hammer 15 including a J hook 15*a*. The rod 8 preferably has an outer diameter that is equal to the outer diameter of the hook bolt 1. Thus, the threads 3 of the hook bolt 1 are turned down from its matching diameter to the rod 8, such that once the rod 8 and the hook bolt 1 are attached, the diameters of the attached hook bolt 1 and rod 8 will be equal. Typically, the outer diameter of the rod 8 and hook bolt 1 is ¾ inch, such that the rod and hook bolt will fit through a hole in a bridge timber of 13/16 inch diameter, which is a typical hole diameter.

FIGS. 2-11 depict, in a series of schematic drawings, the use of the materials shown in FIG. 1 to install a hook bolt on a bridge deck in accordance with the invention.

Figure 2:
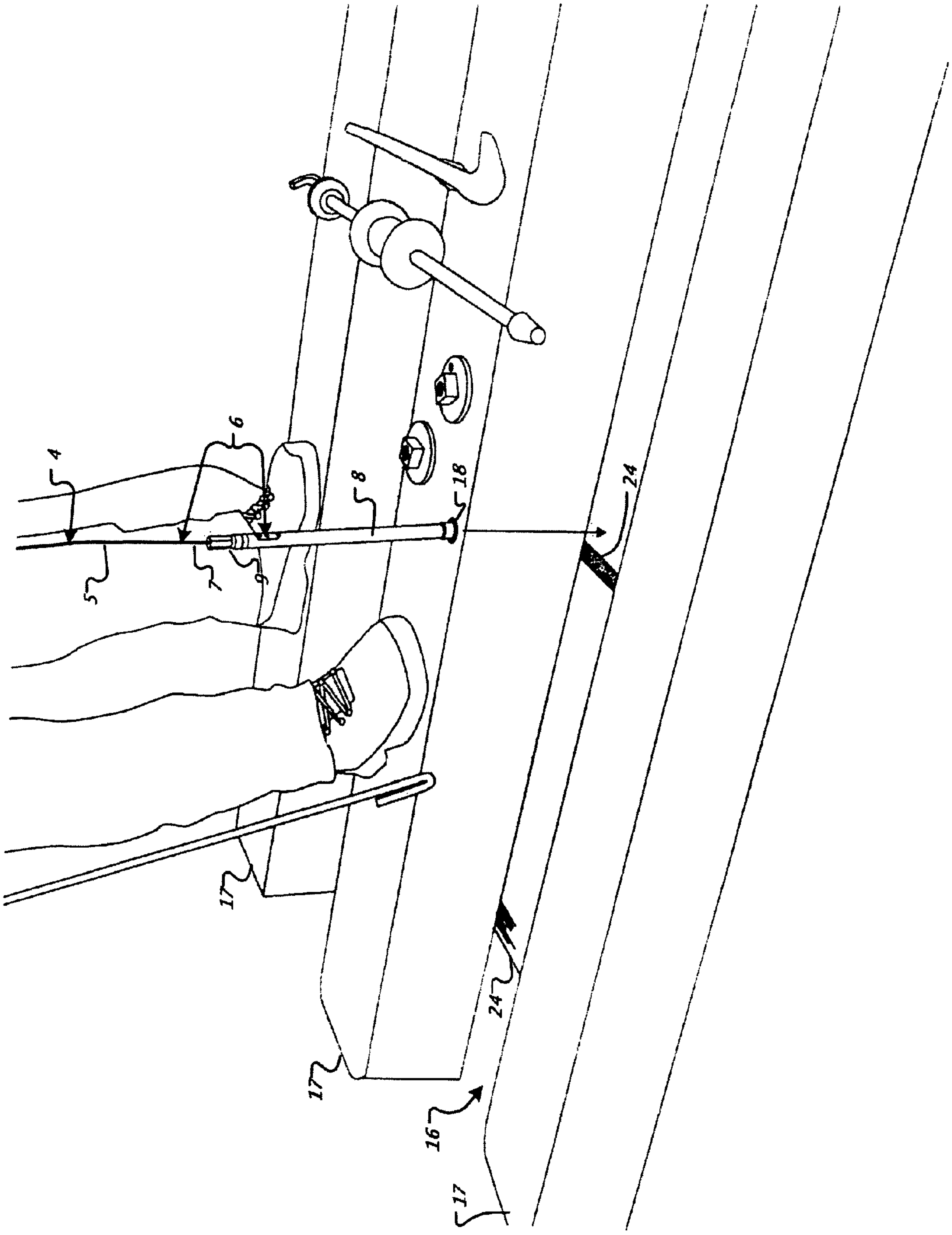
FIG. 2 shows a step or steps in the method of installing a hook bolt in accordance with the invention.

FIG. 2 shows a bridge deck 16 that includes timbers 17 and a structural member 24. One of the timbers 17 includes a hole 18 extending therethrough. In FIG. 2, an installer has begun to pass the second end 6 of tether 4 through the hole 18. As shown in FIG. 2 in a preferred embodiment, the tether 4 includes a cable 5 and a rod 8, wherein the rod 8 is attached, at its first end 9, to the second end 7 of the cable. The tether used in the invention can be designed in accordance with other embodiments, and the principal function of the tether is to have a portion of it be placed below the bridge deck such that in additional steps the portion below the bridge deck can be captured and drawn back upward between or around the timbers 17 (i.e. not back through the hole into which it was lowered) to a position above the bridge deck.

Figure 3:
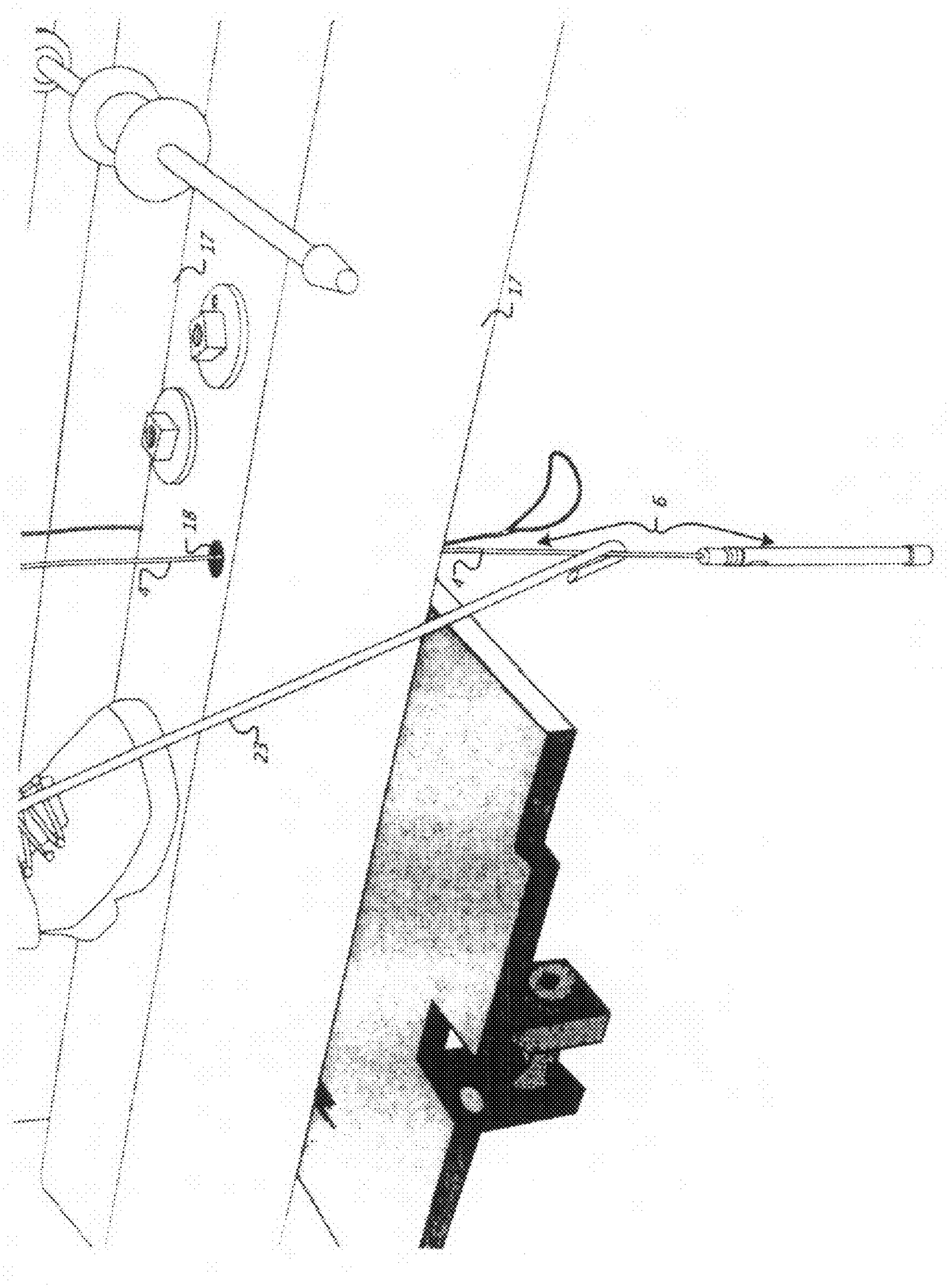
FIG. 3 shows a step or steps in the method of installing a hook bolt in accordance with the invention.

FIG. 3 shows another step in the method of installing a hook bolt. In FIG. 3, the second end 6 of tether 4 has been lowered through the hole 18 in timber 17. The installer has used capturing hook 23 to capture the portion of the tether 4 (a portion of the second end 6) that was lowered under the bridge deck. The captured tether can then be drawn upward between timbers 17.

Figure 4:
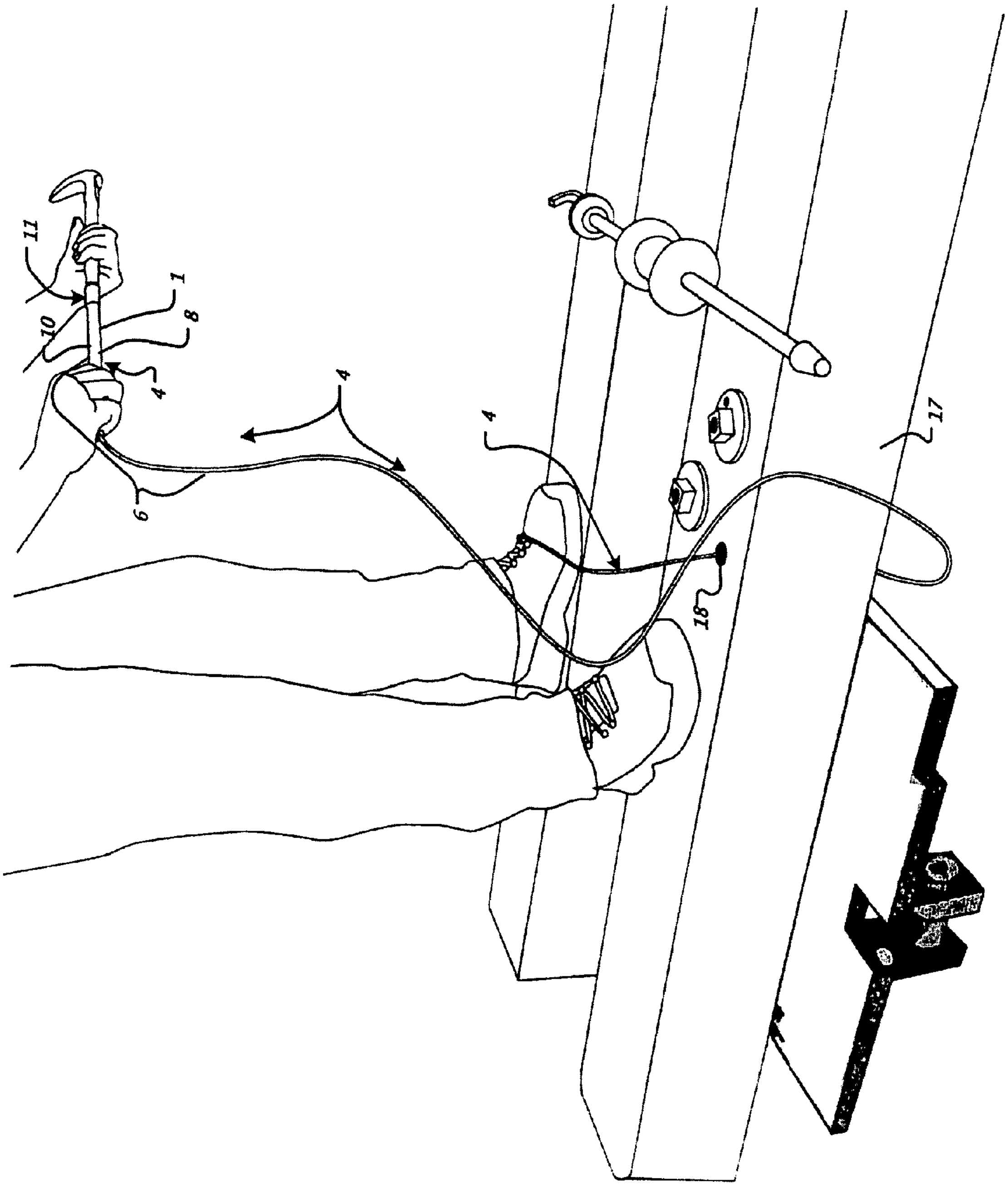
FIG. 4 shows a step or steps in the method of installing a hook bolt in accordance with the invention.

In FIG. 4, the portion of the tether 4 that was lowered through hole 18 is shown as having been drawn upward around the timber 17 (and between timber 17 and adjacent timbers not shown in the Figure) and above the bridge deck. Also in FIG. 4, the installer is engaging the hook bolt 1 with the second end 6 of the tether 4. More particularly, and in the preferred embodiment shown in FIG. 4, the internal threads 11 at the second end 10 of the rod 8 are engaged with the matching threads 3 of the hook bolt 1.

Figure 5:
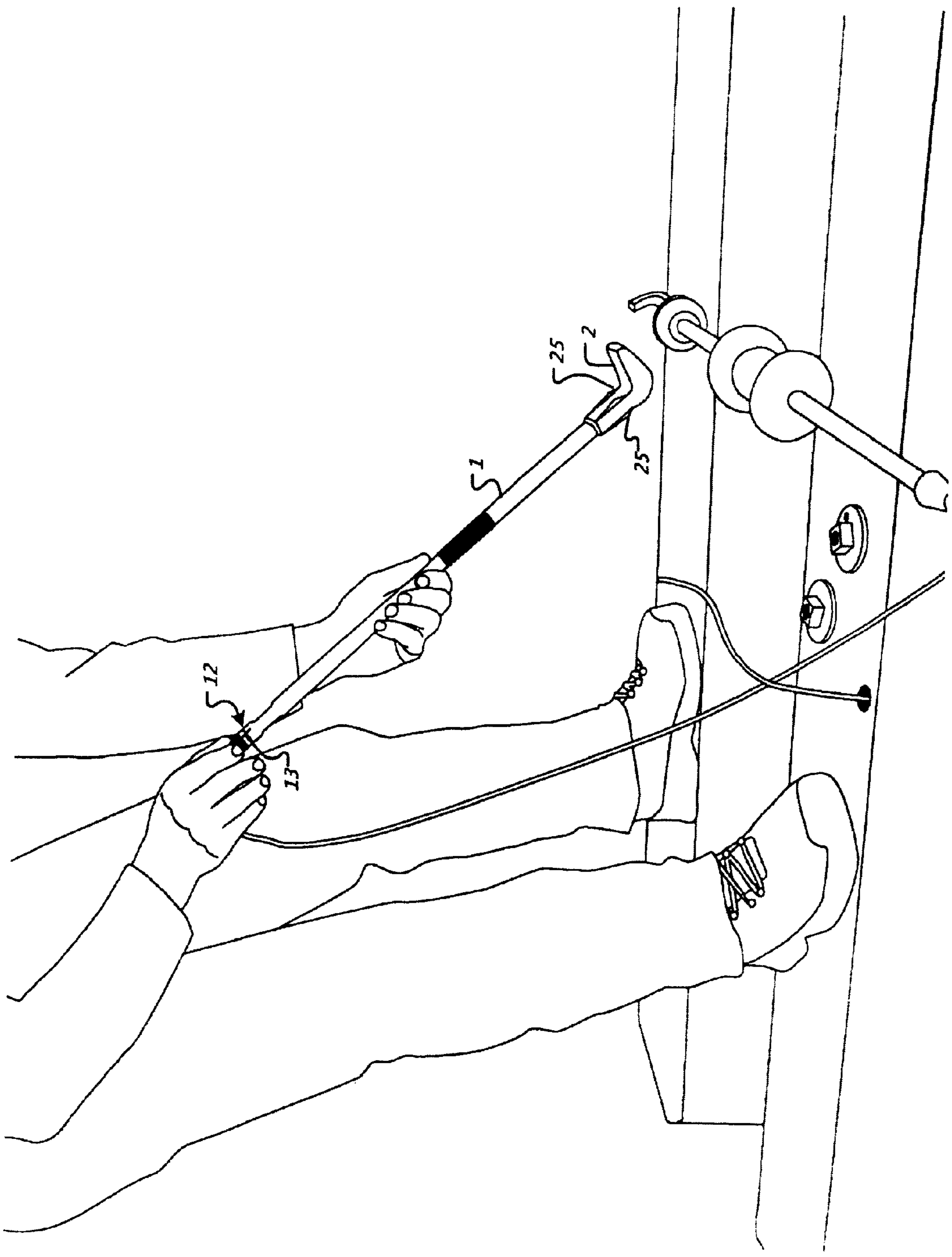
FIG. 5 shows a step or steps in the method of installing a hook bolt in accordance with the invention.

In FIG. 5, the installer is aligning the index 12 with the direction at which the hook 2 extends from the body of hook bolt 1. In preferred embodiments, and as shown in FIG. 5, the index 12 includes a notched ring 13.

Figure 6:
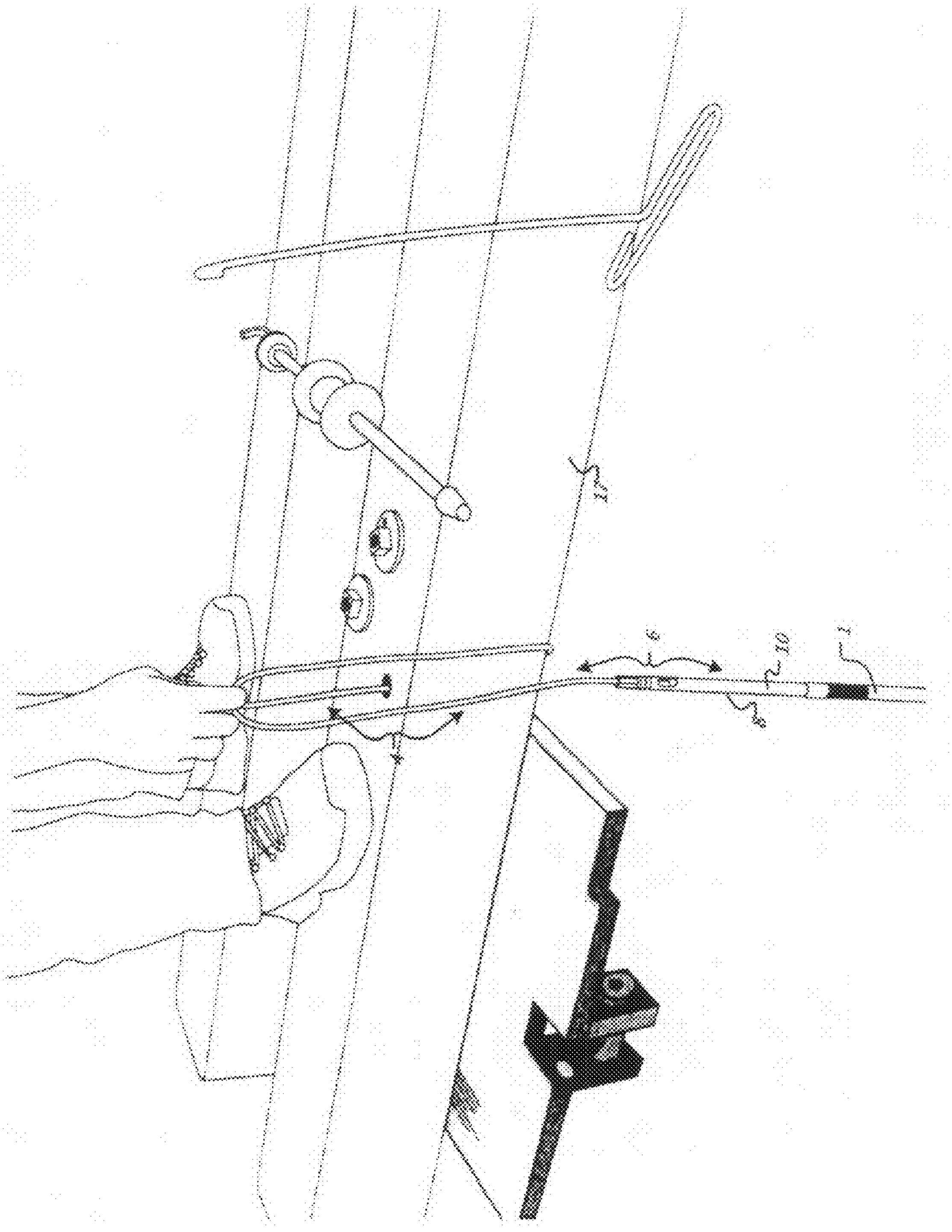
FIG. 6 shows a step or steps in the method of installing a hook bolt in accordance with the invention.

FIG. 6 shows tether 4, now with the hook bolt 1 attached to the second end 6 of tether 4 (preferably attached to the second end 10 of rod 8, as shown in the Figure), being lowered around the timber 17 and between adjacent timbers, back to a position below the timber 17, and below the bridge deck comprised of timbers 17 and structural member 24.

Figure 7:
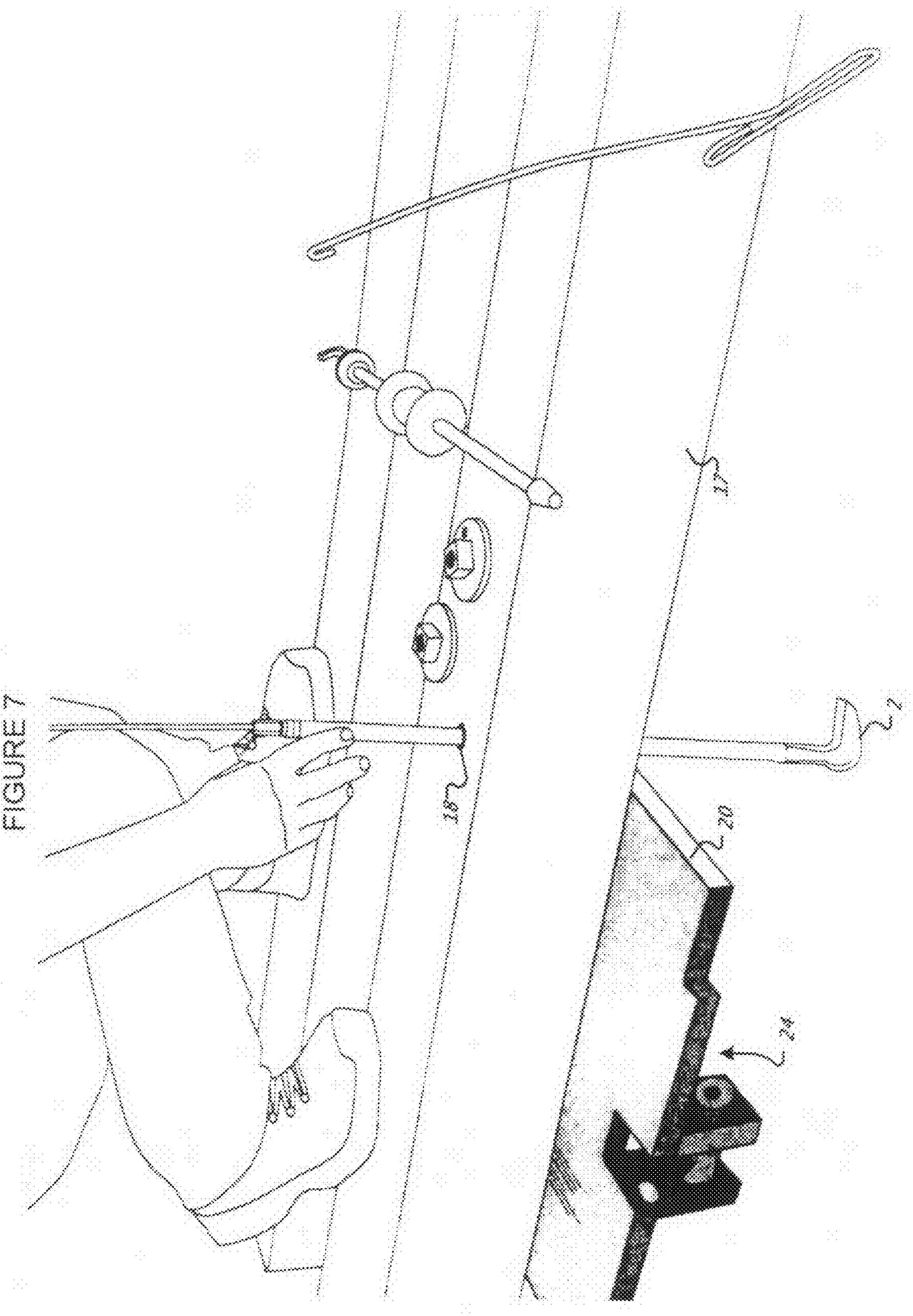
FIG. 7 shows a step or steps in the method of installing a hook bolt in accordance with the invention.
Figure 8:
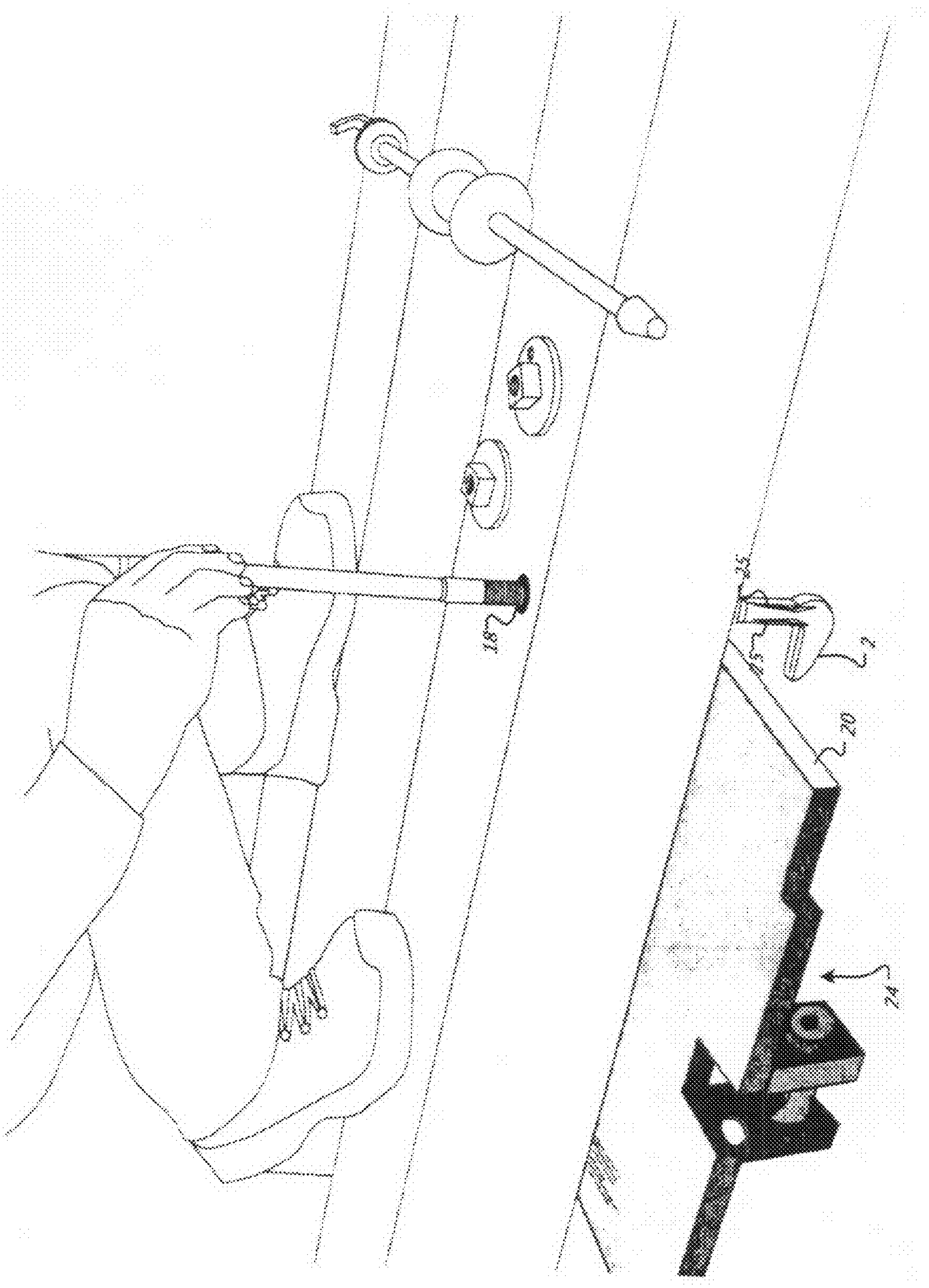
FIG. 8 shows a step or steps in the method of installing a hook bolt in accordance with the invention.

FIGS. 7 and 8 show the step of drawing the hook bolt (via the tether with which it is engaged) upward trough the hole 18. In FIG. 7, the hook bolt 1 is drawn upward through the hole 18. In FIG. 8, the hook bolt is positioned, using the index that is aligned with the direction of the hook 2 extending from the body of the hook bolt 1, such that the hook 2 is in position to engage with the flange 20 of the structural member 24 when the hook bolt is driven further upward toward the bridge deck. At this point, the tether can be pulled or drawn upward to engage fins 25 with the timber 17 and thus fix the hook bolt in properly aligned position for fastening and engagement with the structural member.

Figure 9:
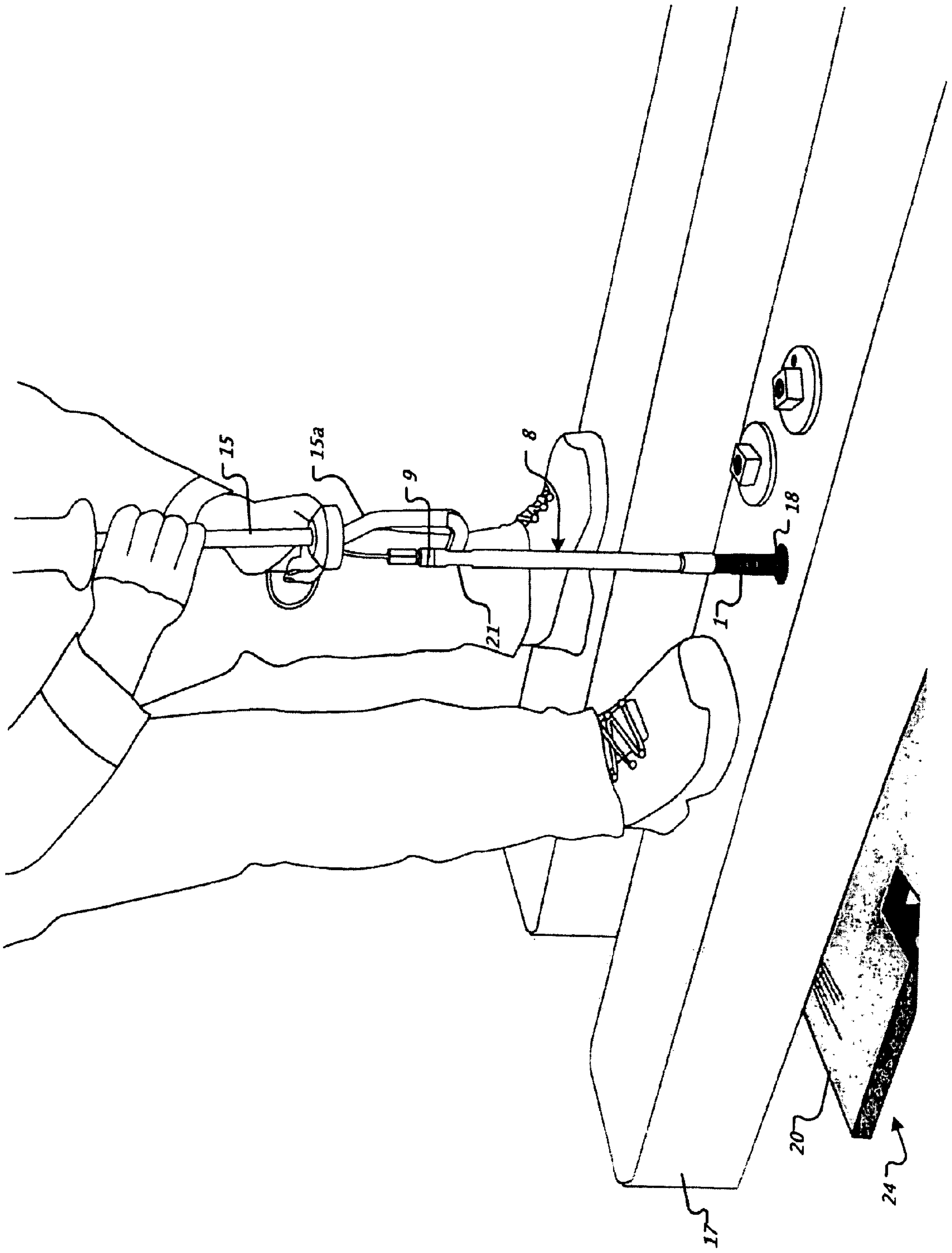
FIG. 9 shows a step or steps in the method of installing a hook bolt in accordance with the invention.
Figure 10:
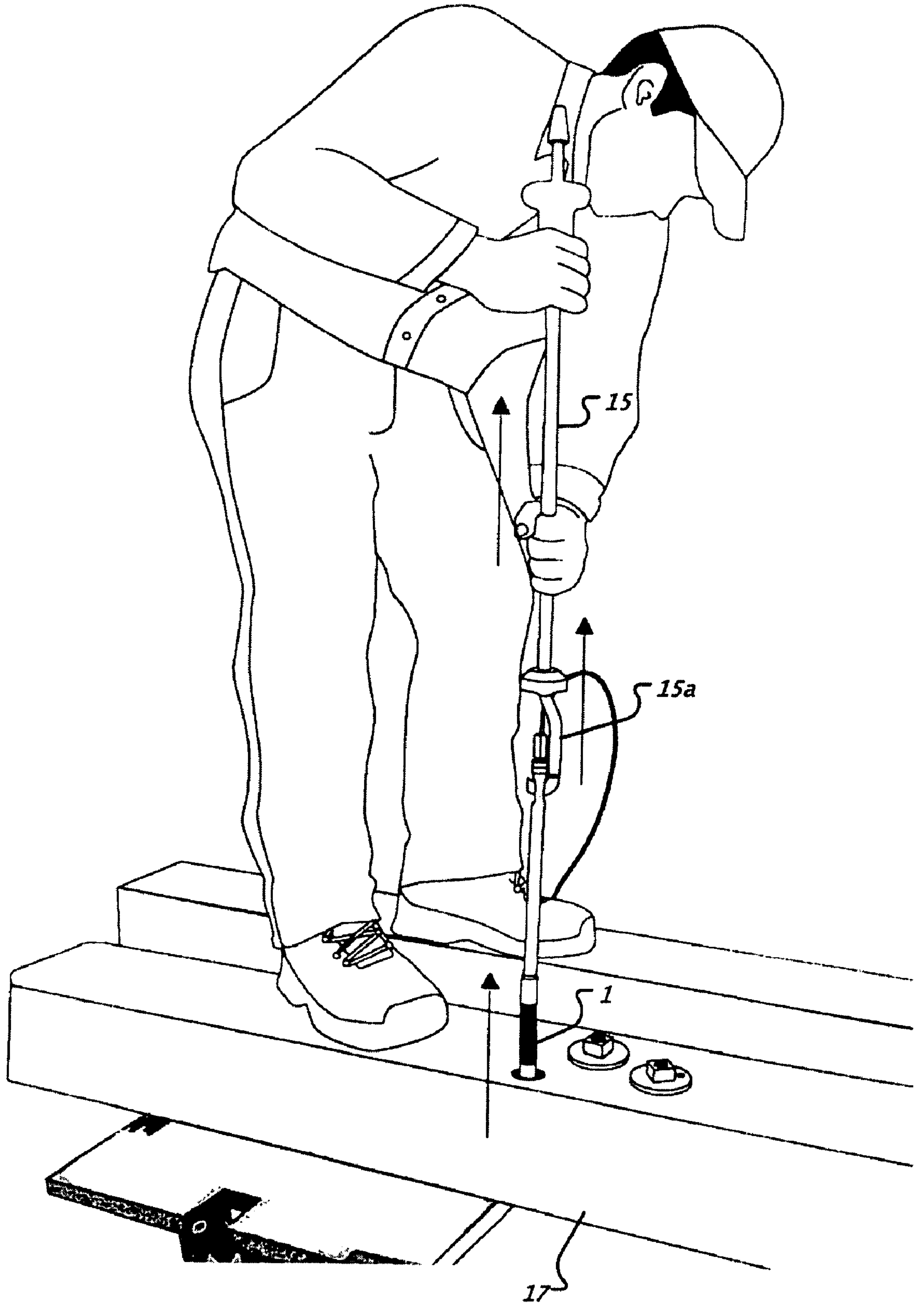
FIG. 10 shows a step or steps in the method of installing a hook bolt in accordance with the invention.

FIGS. 9 and 10 show an additional steps in the method for installing a hook bolt. Once the hook bolt 1 is brought into aligned position such that the hook 2 is aligned to engage with the flange 20 of the structural member 24 of the bridge deck, the hook bolt 1 is positioned to be driven into the timber 17 and the hook 2 is positioned to be engaged with the flange 20. As noted, once the rod 8 (with the hook bolt 1 attached) begins feeding upward through the hole, the installer may preferably pull upward on the cable 5 to engage the fins 25 of the hook bolt 1 with the timber 17.

In FIG. 9, in accordance with a preferred embodiment, a slide hammer 15, of the type known in the art, is engaged with the rod 8. Rod 8 preferably includes a slot 21, proximal to the first end 9 of the rod 8, that can engage with the slide hammer 15. Preferably, the slide hammer includes a hook, for example, a J hook 15*a*, to engage with the slot on the rod. FIG. 10 depicts the use of slide hammer 15 to drive the hook bolt 1 upward and into further engagement with the timber 17. As shown in FIG. 1 and subsequent Figures, the hook bolt preferably includes fins 25 that engage with the wood timber 17 when the hook bolt 1 is driven into the timber, and that then assist in holding the hook bolt in place. The hook bolt 1 is preferably driven into the timber 17 with the slide hammer 15 such that a portion of the threaded end of the hook bolt 1 engaged with the rod 8 passes upward through the hole 18 to the upper side of the bridge deck, as shown in FIG. 9. This is typically accomplished with three to four upward thrusts of the slide hammer. The rod 8 may then be disengaged from the hook bolt 1. Once the rod 8 is then disengaged from the hook bolt 1, at least a portion of the threads 3 are above the bridge deck, and the fastening of the hook bolt 1 can be completed. For example, a washer and bolt combination, such as washer and bolt combination 14 in FIG. 1, can be used to complete the fastening, and as the fastening is completed the hook 2 of the hook bolt 1 comes into engagement with the flange 20.

Figure 11:
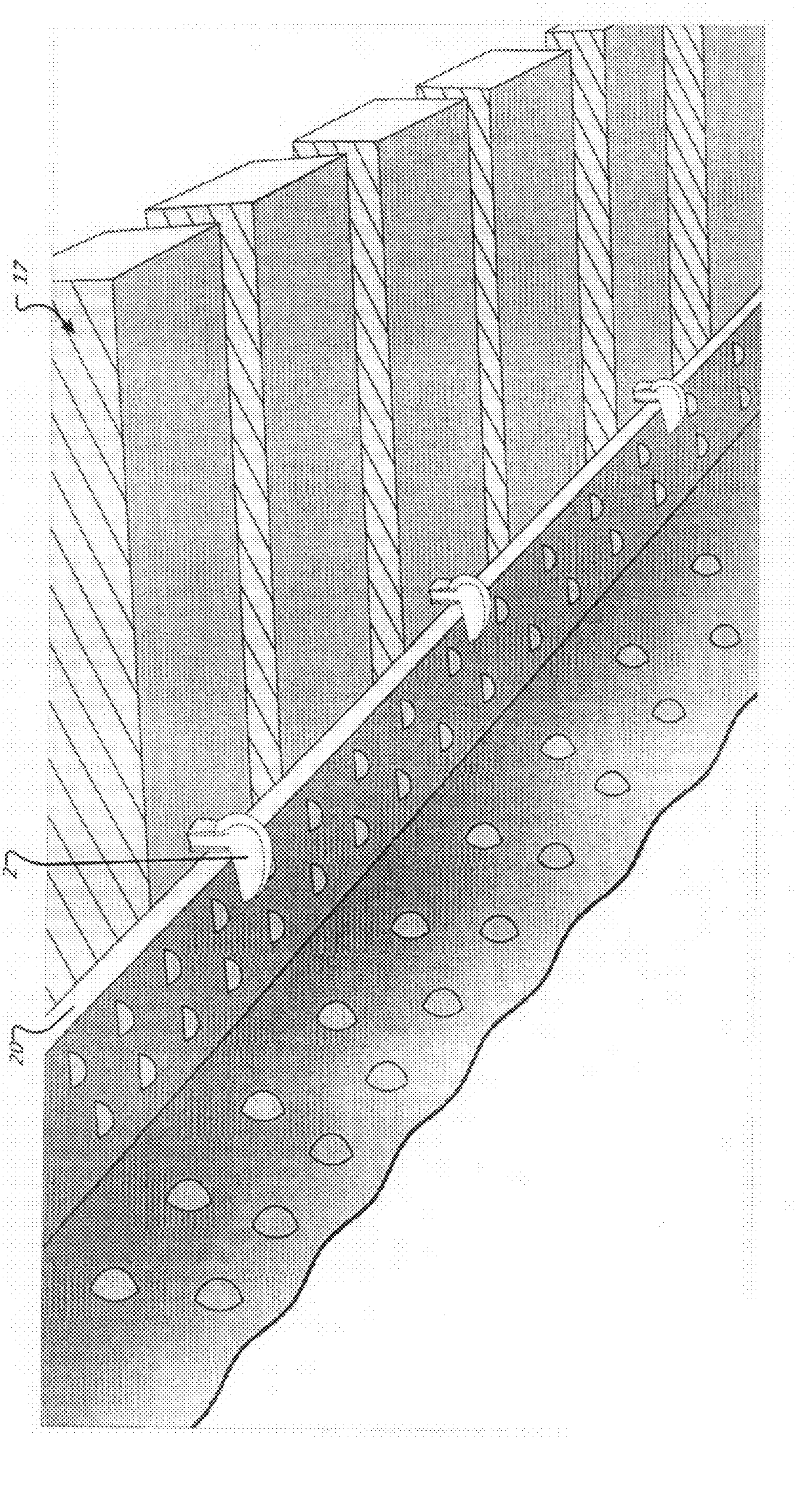
FIG. 11 depicts the underside of a bridge deck with hook bolts installed.

FIG. 11 shows a view of the bottom of a bridge deck, with the hook bolts 1 installed. The hooks 2 of the hook bolts are engaged with the flange 20 of structural member 24, having been aligned in that direction using the installation method of the invention, including the index 12 on the rod 8 to align the direction of the hook 2.

Other embodiments of the invention are within the scope of the appended claims.

What is claimed is:

1. A method of installing a hook bolt on a bridge deck, wherein the bridge deck comprises timbers affixed to structural members, comprising the steps of:

providing a tether adapted to engage with a hook bolt, said tether having first and second ends;

passing said second end of said tether through a hole in a bridge timber such that said second end is below said bridge timber;

capturing said tether from below said bridge timber;

drawing upward a portion of said tether that was passed below the bridge deck;

engaging a hook bolt with said second end of said tether;

lowering said hook bolt below said bridge deck; and drawing said hook bolt upward into said hole.

2. The method of claim 1, wherein said tether comprises a cable having first and second ends, and a rod attached at one end to said second end of said cable.

3. The method of claim 2, wherein said rod comprises threads at a second end.

4. The method of claim 3, wherein said rod comprises an index.

5. The method of claim 4, where in said index comprises a notched ring.

6. The method of claim 4, wherein said hook bolt comprises matching threads to said threads on said rod.

7. The method of claim 4, wherein engaging said hook bolt with said tether comprises engaging said threads on said rod with said matching threads on said hook bolt.

8. The method of claim 7, further comprising the step of aligning said index with the direction of the hook on said hook bolt.

9. The method of claim 8, further comprising the step of driving said hook bolt into said timber.

10. The method of claim 9, wherein said hook bolt comprises at least one fin.

11. The method of claim 10, wherein said tether comprises a cable having first and second ends, and a rod attached at one end to said second end of said cable, and wherein said rod comprises a slot proximal to said end attached to said cable.

12. The method of claim 11, wherein said step of driving said hook bolt into said timber comprises the steps of: aligning said index such that the hook of said hook bolt is positioned to engage with a flange of a structural member; drawing said tether upward to engage said fins with said bridge timber; providing a slide hammer; engaging said slide hammer with said slot of said rod; operating said slide hammer to drive said hook bolt into said timber such that a portion of said hook bolt is above said bridge timber; disengaging said rod from said hook bolt; and fastening said hook bolt to said bridge timber.

13. The method of claim 12, wherein fastening said hook bolt comprises the step fastening said hook bolt to said bridge timber with a washer and bolt combination and thereby bringing the hook of said hook bolt into engagement with a flange of a structural member.

14. The method of claim 1, wherein drawing said tether upward between bridge timbers comprises capturing said tether below said bridge deck with a hook.

* * * * *